US 9,263,980 B2

(12) United States Patent
Deng (10) Patent No.: US 9,263,980 B2
(45) Date of Patent: Feb. 16, 2016

(54) REDUCTION OF NOISE AND VIBRATIONS OF AN ELECTROMECHANICAL TRANSDUCER BY USING A MODIFIED STATOR COIL DRIVE SIGNAL COMPRISING HARMONIC COMPONENTS (75) Inventor: Heng Deng, Brande (DK)

(73) Assignee: SIEMENS AKTIENGESELLSCHAFT, München (DE)

( * ) Notice: Subject to any disclaimer, the term of this patent is extended or adjusted under 35 U.S.C. 154(b) by 521 days.

(21) Appl. No.: 13/549,939

(22) Filed: Jul. 16, 2012

(65) Prior Publication Data
US 2013/0027001 A1    Jan. 31, 2013

(30) Foreign Application Priority Data
Jul. 27, 2011 (EP) .................................. 11175583

(51) Int. Cl.
H02P 9/02      (2006.01)
H02P 29/00     (2006.01)
H02P 101/15    (2015.01)
H02P 21/00     (2006.01)

(52) U.S. Cl.
CPC .............. *H02P 9/02* (2013.01); *H02P 29/0038* (2013.01); *H02P 21/00* (2013.01); *H02P 2101/15* (2015.01); *Y02E 10/725* (2013.01)

(58) Field of Classification Search
CPC ............ Y02E 10/725; H02P 2009/004; H02P 29/0038; H02P 9/02
USPC .......................................................... 322/58
See application file for complete search history.

(56) References Cited

U.S. PATENT DOCUMENTS 6,867,524 B2    3/2005 Liang
6,940,207 B2 *  9/2005 Kato ............................. 310/309

(Continued)

FOREIGN PATENT DOCUMENTS

CN    101095278 A    12/2007
CN    101399515 A    4/2009

(Continued)

OTHER PUBLICATIONS

Reuter et al., "Torque ripple in a Vertical Axis Wind Turbine", 1978. Sandia National Laboratory, NM.*

(Continued)

*Primary Examiner* — Robert Fennema
*Assistant Examiner* — Fenyang Stewart (57) ABSTRACT A method for controlling the operation of an electromechanical transducer is provided. The method includes (a) determining during a first period of time a first strength of the harmonic operational behavior of the transducer, (b) determining during a second period of time a second strength of the harmonic operational behavior of the transducer, wherein the second period of time is different from the first period of time, (c) calculating a harmonic control signal in response to both the determined first strength of the harmonic operational behavior and the determined second strength of the harmonic operational behavior, (d) generating a modified drive signal based on the calculated harmonic control signal, and (f) supplying the generated modified drive signal to electromagnetic coils of a stator of the transducer. Further, a corresponding control system for controlling the operation of an electromechanical transducer is provided.

16 Claims, 4 Drawing Sheets (56) References Cited

U.S. PATENT DOCUMENTS

| | | | |
|---|---|---|---|
| 7,309,930 B2* | 12/2007 | Suryanarayanan et al. | 290/55 |
| 2009/0267555 A1 | 10/2009 | Hiti | |
| 2010/0164416 A1* | 7/2010 | Yamada | 318/400.13 |

FOREIGN PATENT DOCUMENTS

| | | |
|---|---|---|
| CN | 101552591 A | 10/2009 |
| EP | 2043255 A2 | 4/2009 |
| JP | 2003061399 A | 2/2003 |

OTHER PUBLICATIONS

Shoureshi et al., European Patent Application Publication No. EP0693748 A2.*

Reuter et al., 1978 Sandia Report "Torque ripple in a Vertical Axis Wind Turbine", Sandia National Laboratory.*

Deng, 2007 Thesis, "High-performance digital control of UPS inverters", National University of Singapore.*

* cited by examiner

REDUCTION OF NOISE AND VIBRATIONS OF AN ELECTROMECHANICAL TRANSDUCER BY USING A MODIFIED STATOR COIL DRIVE SIGNAL COMPRISING HARMONIC COMPONENTS

CROSS REFERENCE TO RELATED APPLICATIONS

This application claims priority of European Patent Office Application No. 11175583.1 EP filed Jul. 27, 2011. All of the applications are incorporated by reference herein in their entirety.

FIELD OF INVENTION

A method for controlling the operation of an electromechanical transducer, which in particular is an electric generator for a wind turbine, with a stator and a rotor is provided. Further, a control system and a computer program for controlling the operation of an electromechanical transducer are provided.

ART BACKGROUND

Electromechanical transducers are machines, which convert electrical energy into mechanical energy or vice versa. An electric motor is a widely used electromechanical transducer that converts electrical energy into mechanical energy using magnetic field linkage. An electric generator is an electromechanical transducer that converts mechanical energy into electrical energy also using a magnetic field linkage.

An electromechanical transducer comprises a stator and a rotor. The stator is an assembly, which represents the stationary part of an electromechanical transducer. The rotor is an assembly, which represents the moving and in particular the rotating part of an electromechanical transducer.

In order to provide magnetic field linkage, permanent magnets may be used in particular for a rotor of an electromechanical transducer. In recent years, especially since the introduction of rare-earth magnetic materials, permanent magnet (PM) electromechanical transducers have become popular since they eliminate the need for commutators/collectors and brushes, which are commonly used with conventional Direct Current (DC) electromechanical transducer. The absence of an external electrical rotor excitation eliminates losses on the rotor and makes permanent magnet electromechanical transducers more efficient. Further, the brushless design of a PM electromechanical transducer allows conductor coils to be located exclusively in the stationary stator. In this respect, it is mentioned that non-PM electromechanical transducers, which are equipped with commutators and brushes, are typically susceptible to significantly higher maintenance costs.

PM-electromechanical transducers are also known for their durability, controllability and absence of electrical sparking. PM-electromechanical transducers are widely used in many applications such as electric vehicles (electromechanical transducer is a motor) or in power generation systems (electromechanical transducer is a generator) such as for instance a wind turbine.

One challenge of PM-electromechanical transducers is cogging torque. Cogging torque is produced between the rotor and the stator due to a spatial meeting of "sharp edges" of rotor mounted permanent magnets and stator coils when the PM-electromechanical transducer is in operation. In a PM-electric generator, cogging torque is an undesired effect that contributes to a so called "torque ripple" on the electric power output signal of the generator.

Another challenge of PM-transducers is the mechanical "radial force/pressure ripple". Both effects lead to unwanted vibrations of the PM-electric generator, which cause troublesome acoustic noise. This holds in particular for PM-electric generators, which in particular in wind turbine applications are operated with variable rotational speed. Avoiding or at least reducing acoustic noise and vibrations is a great challenge in the design and/or the operational control of PM-electric generators being used for wind turbines.

One approach to reduce acoustic noise and vibrations is to choose an appropriate design for a PM-electric generator. For example, torque ripple can be reduced by using an appropriate shaping of magnets. Further, a skewing of the rotor magnets has been proposed (e.g. U.S. Pat. No. 6,867,524 B2). However, it is difficult to minimize both torque ripple and radial force/pressure ripple by using a single design for a PM-electromechanical transducer.

Another approach to reduce noise and vibration within a PM-electromechanical transducer is to design mechanical parts of the transducer in such a manner that all resonance frequencies, which can be excited by torque and radial force/pressure ripple, are out of the frequency range. However, in case of a variable rotational speed of the PM-electromechanical transducer, the frequency range that can be excited by torque ripple and/or radial force/pressure ripple is very wide. Therefore, it is very difficult to avoid vibrations within the whole frequency range of the PM electromechanical transducer.

SUMMARY OF THE INVENTION

There may be a need for reducing unwanted vibrations of an electromechanical transducer comprising a rotor being equipped with permanent magnets.

This need may be met by the subject matter according to the independent claims Advantageous embodiments are described by the dependent claims.

According to a first aspect, a method for controlling the operation of an electromechanical transducer, in particular an electric generator of a wind turbine, is described, wherein the electromechanical transducer exhibits a harmonic operational behavior which is given by electric and/or mechanic oscillations having frequency components being different from a fundamental frequency being assigned to a fundamental operational behavior of the electromechanical transducer.

The described method comprises (a) determining during a first period of time a first strength of the harmonic operational behavior of the electromechanical transducer, (b) determining during a second period of time a second strength of the harmonic operational behavior of the electromechanical transducer, wherein the second period of time is different from the first period of time, (c) calculating a harmonic control signal in response to both the determined first strength of the harmonic operational behavior and the determined second strength of the harmonic operational behavior, (d) generating a modified drive signal based on the calculated harmonic control signal, and (e) supplying the generated modified drive signal to electromagnetic coils of a stator of the electromechanical transducer.

The described control method is based on the idea that acoustic noise and vibrations of and/or within the electromechanical transducer can be reduced by applying a control procedure that is capable of minimizing directly the excitation source of the unwanted harmonic operational behavior. According to the described method, this is realized by a modified drive signal for energizing the stator coils in such a manner that the excitation source of the harmonic operational behavior can be at least partially eliminated. In order to achieve this, the modified drive signal may in particular comprise an alternating current (AC) component.

Further, the generated modified drive signal depends on the harmonic operational behavior, which is shown by the electromechanical transducer behavior at least at two different points in time. This may provide the advantage that an optimal modified drive signal can be supplied to the electromagnetic stator coils which allows for eliminating the excitation source of the harmonic operational behavior to a large extent.

Determining the first strength and/or the second strength may be realized by a measurement process and/or by an estimation procedure. In this respect, measurement means that the strength of the harmonic operational behavior of the electromechanical transducer is directly observed by at least one appropriate sensor such as e.g. a force, a pressure, a vibration and/or an acceleration sensor. In this respect estimation means that strength of the harmonic operational behavior of the electromechanical transducer is indirectly determined e.g. by applying an appropriate harmonic operational behavior model.

In this application, the term "electromechanical transducer" may denote any machine which is capable of converting mechanical (in particular rotational) energy into electric energy or vice versa. Specifically, the electromechanical transducer may be an electric generator such as a wind turbine electric generator or an electric motor such as an electric drive of an electric vehicle.

The term "fundamental frequency" may particularly denote the frequency of any electric and/or mechanic oscillation of and/or within the electromechanical transducer which frequency is associated with a desired operation of the electromechanical transducer. In this respect, the fundamental frequency may be in particular the rotational frequency of the rotor of the electromechanical transducer. Further, with respect to the electric behavior of the electromechanical transducer, the fundamental frequency may be the frequency of the electric signal which (a) in case of a generator application is produced by the electromechanical transducer or (b) in case of a motor application is driving the electromechanical transducer. Typically, there is a fixed integer relationship between the "electric fundamental frequency" and the "mechanic fundamental frequency" of the electromechanical transducer. Of course, if the electromechanical transducer is the generator of a variable speed wind turbine, which is a preferred application area for the control method described in this document, the fundamental frequency will vary over time.

The term "fundamental operational behavior" may particularly denote any mechanic and/or electric oscillation of or within the electromechanical transducer, which has a frequency corresponding to the above described fundamental frequency. Normally, the fundamental operational behavior of a wind turbine electric generator is to produce DC (0 Hz) torque/power. But the electrical fundamental frequency is varying with rotor speed within a range of 8-18 Hz.

The "modified drive signal" may be any electric signal which is used for electrically energizing the stator coils of the electromechanical transducer. Depending on the specific electric circuitry for driving the stator coils the modified drive signal may be a voltage signal or a current signal.

Preferably, the modified drive signal may include modified voltage drive signals Vd and Vq for stator coils of the electromechanical transducer. In a controller controlling the described method these modified voltage drive signals Vd and Vq may be DC components in a d-q rotating frame. Physically, the electrical signal added to the stator coils is fundamental an AC signal in the a-b-c natural frame.

In this respect, it is mentioned that unless other notified all voltage and current signals being used for the control method and the control system described in this document are signals in a synchronized rotating d-q reference frame.

According to an embodiment, the harmonic operational behavior is based on (a) torque ripple oscillations and/or (b) radial force/pressure ripple oscillations. This may provide the advantage that, with the described control method from a practical point of view, the most relevant excitation sources for a harmonic operational behavior of an electromechanical transducer comprising a rotor with permanent magnets (PM) can be minimized.

Generally speaking, the harmonic control signal may be determinant for a harmonic current, which is injected to the stator coils of the electromechanical transducer and which is responsible for minimizing torque ripple oscillations and/or radial force/pressure ripple oscillation of the electromechanical transducer. Thereby, unwanted noise and vibrations cause by these oscillations can be reduced.

In particular in case of a wind turbine, application the injection of the harmonic current to the stator coils may be accomplished by means of a frequency converter. This may provide the advantage that no additional hardware cost will be needed for realizing the described control method. Moreover, there is no need to change the already available hardware design. It is mentioned that the amount of harmonic current, which is typically needed for performing the described control procedure, is not very high. As a consequence, an additional electric loss of the electric generator is also small and typically ignorable.

In this respect, it is mentioned that a frequency converter of a wind turbine is a commonly known electric power device, which is normally used for adapting the AC frequency and the voltage of the electric power signal provided by the electric generator of the wind turbine to the given AC frequency and the given voltage of the power grid. A frequency converter, which is sometimes also referred to as a power converter, typically includes a generator bridge, which in normal operation operates as an active rectifier in order to supply power to a direct current (DC) link. The generator bridge can have any suitable topology with a series of semiconductor power switching devices fully controlled and regulated using a pulse width modulation (PWM) strategy. A usual frequency converter typically includes also a network bridge, which converts this DC power from the DC link to an AC power, which in voltage, frequency and phase angle is matched to the power grid.

According to a further embodiment, (a) during the first period of time a first test drive signal is supplied to the electromagnetic coils of the stator of the electromechanical transducer and (b) during the second period of time a second test drive signal is supplied to the electromagnetic coils of the stator of the electromechanical transducer. Thereby, the second test drive signal is different from the first test drive signal.

This may provide the advantage that in particular during a stable operational state of the electromechanical transducer the drive signal can be a test drive signal which is intentionally varied over time. Therefore, when comparing the first strength of the harmonic operational behavior and the second strength of the harmonic behavior with each other, for further controlling the operation of the electromechanical transducer one can calculate an appropriate value for the above defined harmonic control signal, such that in the following a modified drive signal will be generated and supplied to the electromagnetic coils of the stator of the electromechanical transducer, which will be at least approximated to this test drive signal, which yields the smaller strength of the harmonic operational behavior of the electromechanical transducer.

The above described intentional variation of the test signal over time may be carried out in particular after a change of the operational state has been taken place because after a change of the operational state it is very likely that an amended or updated modified drive signal will be necessary in order to again effectively reduce acoustic noise and vibrations of and/or within the electromechanical transducer.

A change of operational state may be given for instance by a change of the working or operating temperature. Accordingly, temperature changes can be taken into account in order to find the appropriate value(s) for the above defined harmonic control signal.

According to a further embodiment, determining the first strength and/or the second strength of the harmonic operational behavior comprises using the result of a direct measurement and/or of an estimation of the harmonic operational behavior.

The direct measurement of the harmonic operational behavior of the electromechanical transducer may comprise for instance a torque measurement, a radial force measurement, a noise measurement (e.g. by a microphone) and/or a vibration measurement (e.g. by an acceleration sensor).

According to a further embodiment, determining the first strength and/or the second strength of the harmonic operational behavior comprises using at least one of a measurement value and/or estimated value and an available system value of observables being indicative for torque ripple oscillations and/or for radial force/pressure ripple oscillations of the electromechanical transducer.

The observables may comprise the strength of the current being actually generated by the electromechanical transducer (in case the electromechanical transducer is an electric generator) or the current being actually consumed by the electromechanical transducer (in case the electromechanical transducer is an electric motor).

The observables may further comprise the actual voltages being applied to the electromagnetic coils of the stator.

Further, the observables may comprise an actual angle between a direct-quadrature (d-q) rotating reference frame of the rotor of the electromechanical transducer and another reference frame (e.g. of the stator of the electromechanical transducer). In this respect it is mentioned that a d-q transformation between the another reference frame of the stator and the rotating reference frame of the rotor is a common mathematical transformation being often used to simplify the analysis of three-phase electric circuits. In the case of balanced three-phase electric circuits, application of the d-q transformation reduces the three AC quantities to two DC quantities. As a consequence, simplified calculations can be carried out on these imaginary DC quantities before performing the inverse transform to recover the actual three-phase AC results.

It is mentioned that in accordance with another embodiment, the strength of the harmonic operational behavior may also be determined by directly sensing the torque ripple oscillations and/or the radial force/pressure ripple oscillations of the electro-mechanical transducer. Alternatively or in combination, results of measurements of vibrations, noise and/or magnetic flux may be used for determining the strength of the harmonic operational behavior.

According to a further embodiment, calculating the harmonic control signal comprises (a) observing at least one value of operational parameters of the electromechanical transducer and (b) deriving from a database the harmonic control signal as a function of the observed value of the operational parameters of the electromechanical transducer.

Preferably, the database comprises a look-up table, in which appropriate values for the harmonic control signal are stored for a variety of different operational parameters of the electromechanical transducer.

Using the described database for deriving the harmonic control signal may mean that the modified drive signal, which is supplied to the stator coils of the electromechanical transducer, is determined by means of an open loop or a feed forward procedure. This may provide the advantage that an appropriate harmonic control signal can be determined based on the values of operational parameters of the electromechanical transducer, which parameters can be measured easily.

According to a further embodiment, the operational parameters being observed comprise at least one of (a) a frequency of an AC signal being actually generated by the electromechanical transducer or being actually consumed by the electromechanical transducer, (b) a power being actually generated by the electromechanical transducer or being actually consumed by the electromechanical transducer, and (c) an actual rotational angle of the rotor of the electromechanical transducer. This may provide the advantage that with respect to an effective suppression of the harmonic operational behavior an appropriate harmonic control signal can be generated.

The output of the database may be (a) a reference amplitude for at least one harmonic amplitude of the actual current and/or voltage being produced or being consumed by the electromechanical transducer, and (b) a reference phase angle for at least one harmonic amplitude of the actual current and/or voltage being produced or being consumed by the electromechanical transducer.

According to a further embodiment, the database stores reference amplitudes for harmonic currents and/or voltages and reference phase angles for harmonic currents and/or voltages for the harmonic control signal. This may provide the advantage that for different harmonic orders 1, 2, . . . , n optimal compensation currents and/or voltages may be generated in an easy and effective manner.

According to a further embodiment, the method further comprises updating the database based on the determined first strength of the harmonic operational behavior of the electromechanical transducer and on the determined second strength of the harmonic operational behavior of the electromechanical transducer.

Descriptive speaking, an auto sweep procedure over various harmonic control signals and/or various test drive signals can be carried out for finding optimal values for the harmonic control signal. In this case, noise, vibration, torque, force and/or speed of the electric generator shall be measured or estimated in order to indicate a suitable direction of the auto sweep procedure.

The purpose of auto sweeping may be to automatically find optimal phase and amplitude values for the harmonic current and to store these values into the database.

According to a further embodiment, the method further comprises (a) modifying at least one output value of the database, (b) evaluating the strength of torque ripple oscillations and/or radial force/pressure ripple oscillations which occur in response to the at least one modified output value, and (c) determining at least one improved output value of the database based on the evaluated strength. This may provide the advantage that changes in the operational state of the electromechanical transducer can be taken into account by modified or improved output value(s) of the database, which as compared to the previously used output value(s) yields a smaller strength of torque ripple oscillations and/or radial force/pressure ripple oscillations. This means that the modified or improved output value(s) of the database will ensure for an improved or even an optimal harmonic control signal and/or modified drive signal which is supplied to the electromagnetic coils in order to reduce the strength of the torque ripple oscillations and/or the radial force/pressure ripple oscillations.

Preferably the evaluation of the strength of the torque ripple oscillations and/or radial force/pressure ripple oscillations is carried out online or in real time with the modification of the at least one output value of the database or the look-up table. If there is for instance some temperature change, the described scheme which can be called an auto tuning scheme can automatically modify the output value of look up table such that the optimal compensation current is achieved.

The described auto tuning scheme may be used as a fine tuning stage for optimal phase and amplitude for the injected harmonic currents and/or voltages when the electromechanical transducer is operated in a normal or usual operational state. Inside or near the electromechanical transducer a measurement system e.g. for noise, vibration, acceleration and/or torque can indicate noise and/or vibration change(s) of the electromechanical transducer. These change(s) is/are evaluated in response to the modification of at least one output value of the database and for the subsequent operation of the electromechanical transducer the optimal value(s) for the at least one output value of the database can be determined.

According to a further embodiment, generating a modified drive signal comprises adding an AC drive signal being associated with the harmonic operational behavior of the electromechanical transducer to a DC drive signal being associated with the fundamental operational behavior of the electromechanical transducer. This may mean that the mentioned modified drive signal is the sum of the AC drive signal and the DC drive signal. In this respect the DC drive signal can be understood as to represent the optimal drive signal for the stator coils in case of a complete absence of any harmonic operational behavior of the electromechanical transducer. Accordingly, the AC drive signal may be understood as a compensational portion of the modified drive signal, which compensational portion is configured such that the above mentioned sources of harmonic behavior at or within the electromechanical transducer will be eliminated at least partially.

According to a further embodiment, (a) the DC drive signal is generated by a DC controller, which is driven by a fundamental controller for controlling a fundamental drive signal for the electromagnetic coils of the stator, wherein the fundamental drive signal is associated exclusively with the fundamental operational behavior of the electromechanical transducer and (b) the AC drive signal is generated by an AC controller, which is operated as a function of the determined harmonic control signal being indicative for the harmonic operational behavior of the electromechanical transducer.

In this respect it is mentioned that the DC controller and the fundamental controller may be realized by means of two different control units or alternatively by means of a common control unit.

According to a further embodiment, generating a modified drive signal comprises adding the calculated harmonic control signal to a DC drive signal being associated with the fundamental operational behavior of the electromechanical transducer. This may provide the advantage that the harmonic control signal can be directly combined with the DC drive signal in order to yield the modified drive signal for the stator coils of the electromechanical transducer.

Preferably, both the harmonic control signal and the DC drive signal are voltage signals.

According to a further embodiment, the modified drive signal is generated by a general control unit as a function of (a) the calculated harmonic control signal and (b) a fundamental control signal being generated by a fundamental controller for controlling a fundamental drive signal for the electromagnetic coils of the stator, wherein the fundamental drive signal is associated exclusively with the fundamental operational behavior of the electromechanical transducer.

Preferably, the calculated harmonic control signal and the fundamental control signal are simply added and a resulting total control signal is processed by the general control unit.

According to a further embodiment, the modified drive signal is generated as a further function of a current being actually generated by the electromechanical transducer or being actually consumed by the electromechanical transducer. This may provide the advantage that the modified drive signal can be generated with a high accuracy. As a consequence, the excitation source and in particular the above mentioned torque ripple oscillations and/or the above mentioned radial force/pressure ripple oscillations causing the unwanted harmonic operational behavior of the electromechanical transducer can eliminated to a large extend.

According to a further aspect, described is a control system for controlling the operation of an electromechanical transducer, in particular an electric generator of a wind turbine, wherein the electromechanical transducer exhibits a harmonic operational behavior which is given by electric and/or mechanic oscillations having frequency components being different from a fundamental frequency being assigned to a fundamental operational behavior of the electromechanical transducer. The described control system comprises (a) a determining unit for (a1) determining during a first period of time a first strength of the harmonic operational behavior of the electromechanical transducer and for (a2) determining during a second period of time a second strength of the harmonic operational behavior of the electromechanical transducer, wherein the second period of time is different from the first period of time, (b) a calculating unit for calculating a harmonic control signal in response to both the determined first strength of the harmonic operational behavior and the determined second strength of the harmonic operational behavior, (c) a generating unit for generating a modified drive signal based on the calculated harmonic control signal, and (d) a supplying unit for supplying the generated modified drive signal (Vd, Vq) to electromagnetic coils of a stator of the electromechanical transducer.

Also, the described control system is based on the idea that acoustic noise and vibrations of and/or within the electromechanical transducer can be reduced by applying a control procedure that is capable of minimizing directly the excitation source of the harmonic operational behavior.

According to a further aspect, described is a computer program for controlling the operation of an electromechanical transducer, in particular an electric generator for a wind turbine. The computer program, when being executed by a data processor, is adapted for controlling and/or for carrying out the method as described above for controlling the operation of an electromechanical transducer.

As used herein, reference to a computer program is intended to be equivalent to a reference to a program element and/or to a computer readable medium containing instructions for controlling a computer system to coordinate the performance of the above described method.

The computer program may be implemented as computer readable instruction code in any suitable programming language, such as, for example, JAVA, C++, and may be stored on a computer-readable medium (removable disk, volatile or non-volatile memory, embedded memory and/or processor, etc.). The instruction code is operable to program a computer or any other programmable device to carry out the intended functions. The computer program may be available from a network, such as the World Wide Web, from which it may be downloaded.

The described method and/or control system may be realized by a computer program respectively software. However, the method and/or control system may also be realized by one or more specific electronic circuits respectively hardware. Furthermore, the method and/or control system may also be realized in a hybrid form, i.e. in a combination of software modules and hardware modules.

It has to be noted that embodiments have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects are apparent from the examples of embodiments to be described hereinafter and are explained with reference to the examples of embodiments.

DETAILED DESCRIPTION

The illustration in the drawing is schematically. It is noted that in different figures, similar or identical elements are provided with the same reference signs or with reference signs, which are different from the corresponding reference signs only within the first digit.

It is mentioned that in the following description all DC or AC signals or signal components refer to a d-q rotating reference frame. Of course, physically all electric signals being applied to the electric generator are AC signals.

Figure 1:
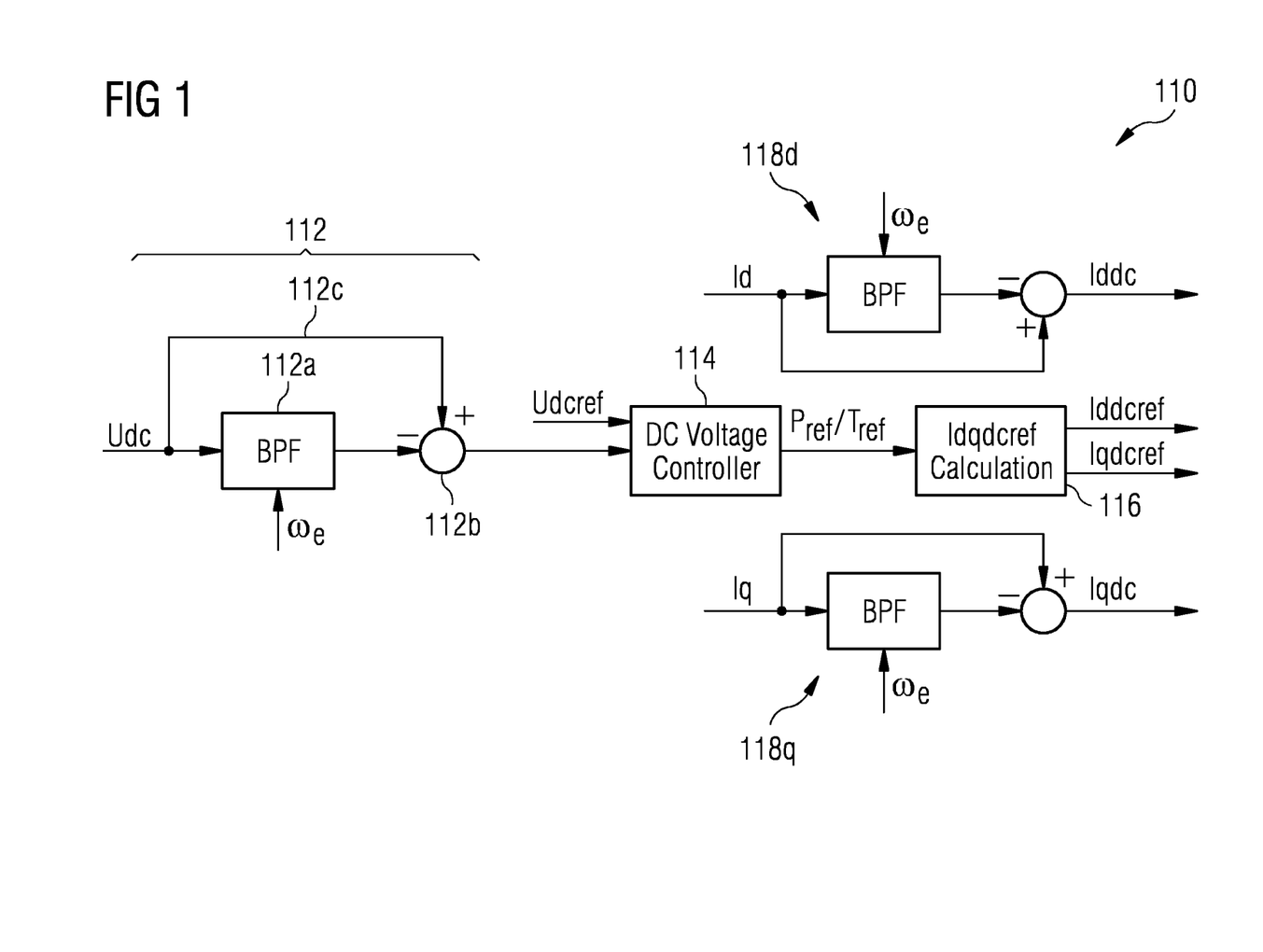
FIG. 1 shows a fundamental controller for controlling (a) a fundamental dc link voltage of a frequency converter and for controlling (b) the generation of a fundamental drive signal for electromagnetic coils of a stator of an electric generator, wherein the fundamental DC drive signal is associated exclusively with the fundamental operational behavior of the electric generator.

FIG. 1 shows a fundamental controller 110 for controlling (a) a fundamental dc link voltage of a frequency converter and for controlling (b) the generation of a fundamental DC drive signal for electromagnetic coils of a stator of an electric generator, wherein the fundamental drive signal is associated exclusively with the fundamental operational behavior of the electric generator. The fundamental controller 110 comprises a band stop filter 112, which receives a signal Udc, which represents a measured DC link voltage of the (not depicted) frequency converter. According to the embodiment described here, the band stop filter 112 is realized with an adapted band pass filter 112a being centered based on a frequency $\omega_e$, which is the actual fundamental electric frequency of the generator, a bypass line 112c and an adder 112b. As can be seen from the labeling of the input terminals of the adder 112b, a signal being provided by the adaptive band pass filter 112a is subtracted from the signal Udc.

The band pass filter 112a may comprise center frequencies of 6 times $\Omega_e$ or 12 times $\Omega_e$ or the combination of both. The band pass filter 112a may in some application be replaced by a high pass filter.

The fundamental controller 110 further comprises a DC voltage controller 114, which provides in response (a) to the output from the adder 112b and (b) to a reference voltage Udcref for the DC voltage of the (not depicted) frequency converter as an output signal a generator power reference signal $P_{ref}$ and/or generator torque reference signal $T_{ref}$. The signal $P_{ref}$ and/or $T_{ref}$ are used as an input signal for a calculation unit 116 for calculating DC current reference signals Iddcref and Iqdcref.

According to another embodiment which is not explicitly shown in the drawing, the band stop filter 112 is not necessary for the fundamental controller. Instead, the generator power reference signal $P_{ref}$ and/or the generator torque reference signal $T_{ref}$ can be directly received from a wind turbine controller, which in a known manner controls the operation of the respective wind turbine.

Further, the fundamental controller 110 further comprises two further band stop filters 118d and 118q, each of which is realized in the same manner as the band stop filter 112 by an adaptive band pass filter, a bypass line and an adder. As can be seen from FIG. 1, the band stop filter 118d receives an input signal Id and the band stop filter 118q receives an input signal Iq. According to the embodiment described here Id and Iq are the actual currents provided by the electric generator in a rotating d-q reference frame. As can be further seen from FIG. 1, the band stop filter 118d provides a signal Iddc and the band stop filter 118q provides a signal Iqdc. The signals Iddc and Iqdc are DC drive current signal for the stator coils of the electric generator. As has already been mentioned above, the band pass filter can also be replaced by a high pass filter in some cases.

Generally speaking, in the fundamental controller 110 the feedback signal of both the measured dc link voltage Udc and the measured actual currents Id and Iq provided by the electric generator are filtered by adaptive band-stop filters 112, 118d and 118q so that the fundamental controller 110 is effectively decoupled from harmonic signals having a frequency being different from the fundamental electric frequency $\omega_e$ of the generator.

Figure 2:
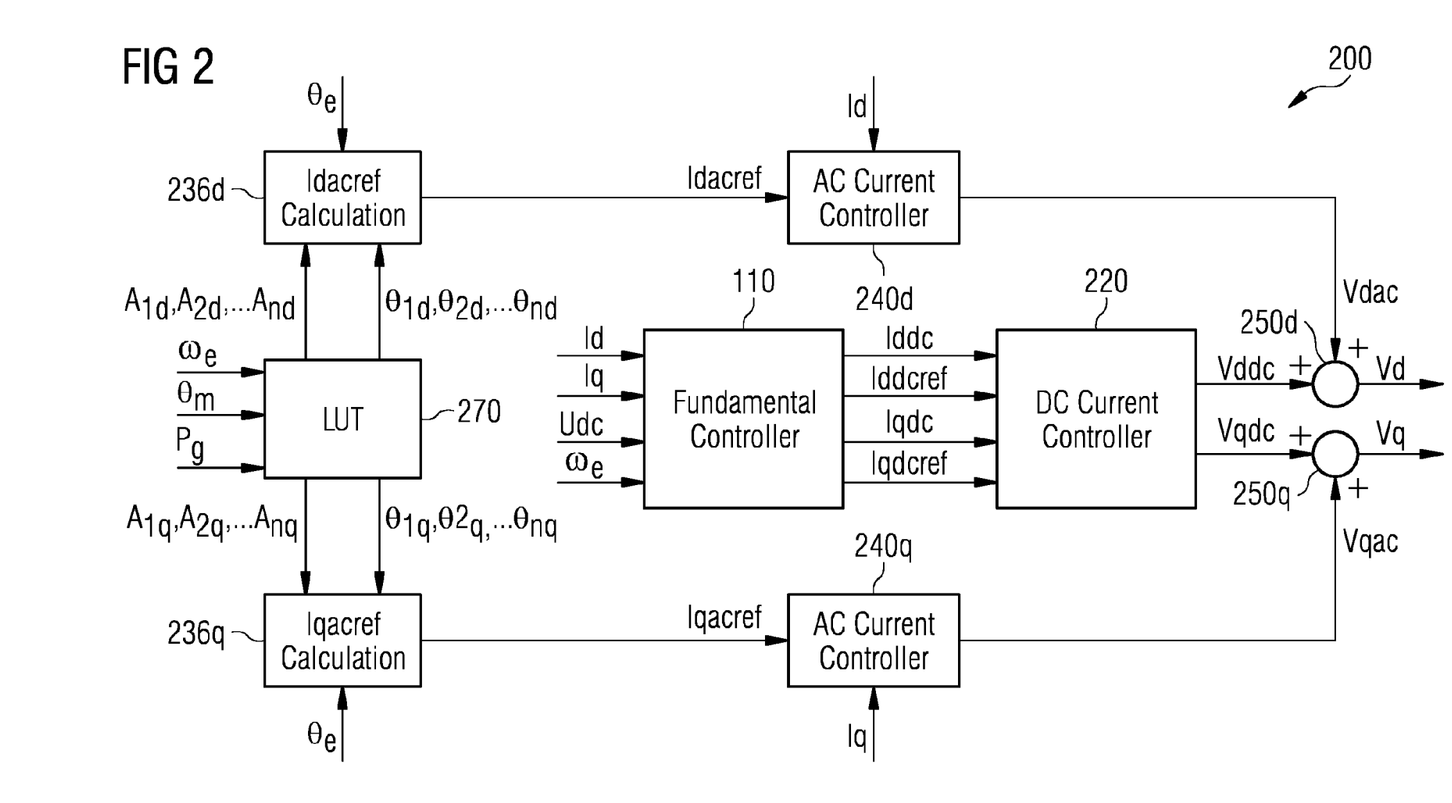
FIG. 2 shows a control system comprising a DC current controller and AC current controllers operating in d-q reference frame for generating a modified drive signal for the stator coils of an electric generator, wherein the modified drive signal is configured for reducing an unwanted harmonic operational behavior of the electric generator.

FIG. 2 shows a control system 200 comprising a DC current controller 220 and AC current controllers 240d, 240q operating in d-q reference frame for generating modified voltage drive signals Vd and Vq for the stator coils of an electric generator. The modified voltage drive signals Vd and Vq are configured for reducing an unwanted harmonic operational behavior of the electric generator.

The control system 200 comprises a database 270 having stored a look-up table. As can be seen from FIG. 2, according to the embodiment described here the database 270 receives as input signals the fundamental electric frequency $\omega_e$ of the electric generator, the actual rotational angle of the rotor $\theta_m$ (rotor position) and a signal representing the actual power production $P_g$ of the electric generator. In response to these signals $\theta_m$, $\omega_e$ and $P_g$ the database 270 provides reference amplitudes $A_{1d}$, $A_{2d}$, ..., $A_{nd}$ for harmonic currents and reference phase angles $\theta_{1d}$, $\theta_{2d}$, ..., $\theta_{nd}$ for harmonic currents to a calculation unit 236d, which in response thereto and in response to the actual angle $\theta_c$ between rotating reference frame and another reference frame produces the AC current reference signal Idacref. Thereby, the harmonic number is denominated with 1, 2, ..., n. Correspondingly, the database 270 provides reference amplitudes $A_{1q}$, $A_{2q}$, ..., $A_{nq}$ for harmonic currents and reference phase angles $\theta_{1q}$, $\theta_{2q}$, ..., $\theta_{nq}$ for harmonic currents to the calculation unit 236q, which in response thereto and in response to the actual angle $\theta_c$ between rotating reference frame and another reference frame produces the AC current reference signal Iqacref.

As can be seen from FIG. 2, the AC current reference signal Idacref is provided to the AC current controller 240d, which in consideration of the actual current Id provided by the electric generator generates an AC drive signal Vdac. Correspondingly, the AC current reference signal Iqacref is provided to the AC current controller 240q, which in consideration of the actual current Iq provided by the electric generator generates an AC drive signal Vqac. In this respect it is pointed out that the generator currents are measured the a-b-c reference frame and are then transformed to d-q reference frame in order to obtain Id and Iq.

The control system 200 further comprises two adders 250d and 250q. As can be seen from FIG. 2, the adder 250d receives a DC drive signal Vddc from the DC current controller 220, which is added to the AC drive signal Vdac yielding the modified voltage drive signal Vd, which is fed to the stator coils of the electric generator. Correspondingly, the adder 250q receives a DC drive signal Vqdc from the DC current controller 220, which is added to the AC drive signal Vqac yielding the modified voltage drive signal Vq, which is also fed to the stator coils of the electric generator.

Figure 3:
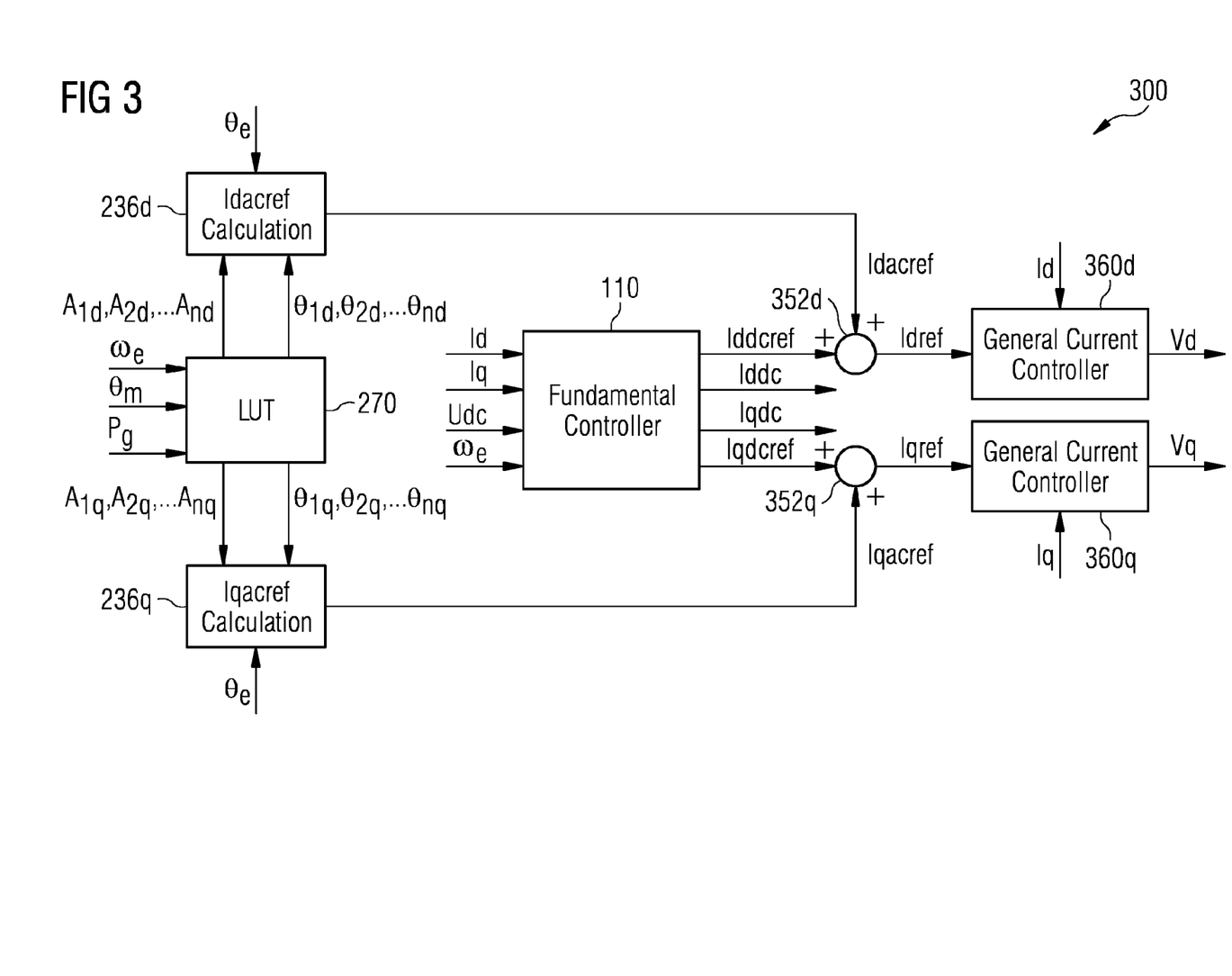
FIG. 3 shows a control system comprising general current controllers operating in d-q reference frame for generating a modified drive signal for the stator coils of an electric generator, wherein the modified drive signal is configured for reducing an unwanted harmonic operational behavior of the electric generator.

FIG. 3 shows a control system 300, which differs from the control system 200 illustrated in FIG. 2 in that the DC current controller 220 and the AC current controller 240d, 240q are replaced by general current controllers 360d, 360q. As can be seen from FIG. 3, the adding procedure is carried out on the level of the reference signals Iddcref and Iqdcref and the reference signals Idacref and Iqacref, respectively. Correspondingly, adder 352d and 352q being located upstream with respect to the general current controller 360d, 360q are used.

It is mentioned that by contrast to the control system 200 in the embodiment described here the signals Iddc and Iqdc, which are provided by the fundamental controller 100, are not used.

Descriptive speaking: In the control system 300 harmonic current reference signals Idacref, Iqacref are added together with the respective fundamental current reference signals Iddcref, Iqdcref so that a total current reference signal Idref, Iqref in the rotating d-q reference frame can be achieved. The general current controller 360d, 360q is used, in consideration of the actual current Id, Iq provided by the electric generator, to force the stator coil current to follow the total current reference signals Idref and Iqref.

At this point it is mentioned that in this application total current reference signals Idref and Iqref are also denominated as total control signals.

Figure 4:
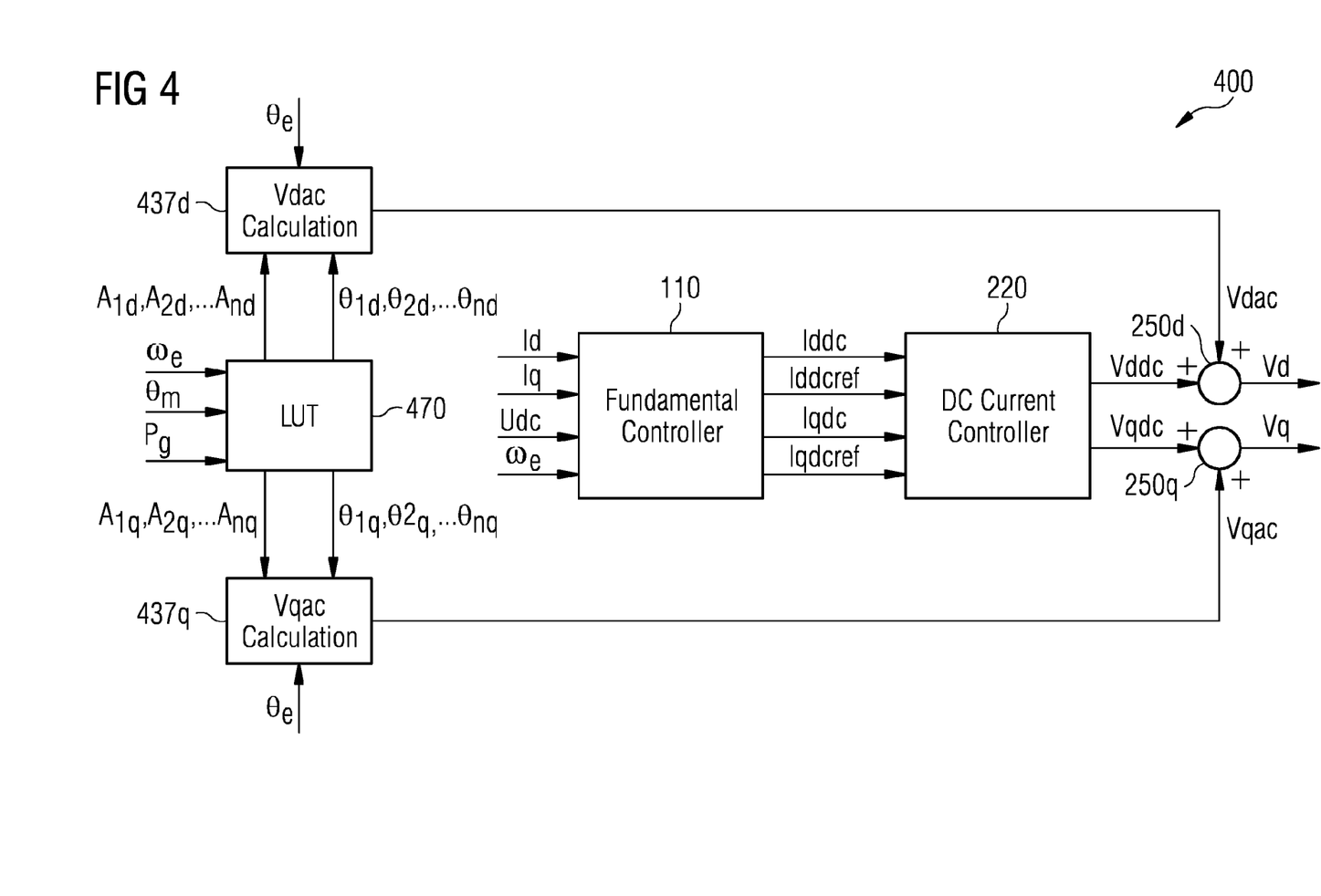
FIG. 4 shows a control system comprising a DC current controller and a database with a look-up table which is used to directly calculate a harmonic voltage for generating a modified drive signal for the stator coils of an electric generator, wherein the modified drive signal is configured for reducing an unwanted harmonic operational behavior of the electric generator.

FIG. 4 shows a control system 400 comprising a DC current controller 220 and a database with a look-up table 470 which is used to directly calculate a harmonic voltage for generating modified voltage drive signals Vd and Vq for the stator coils of an electric generator. Again, the modified voltage drive signals Vd and Vq are configured for reducing an unwanted harmonic operational behavior of the electric generator.

According to the embodiment described here, the database 470 receives as input signals the fundamental electric frequency $\omega_e$ of the electric generator, the actual rotational angle of the rotor $\theta_m$ (rotor position) and a signal representing the actual power production $P_g$ of the electric generator. In response to these signals $\theta_m$, $\omega_e$ and $P_g$ the database 470 provides reference amplitudes $A_{1d}$, $A_{2d}$, ..., $A_{nd}$ for harmonic voltages and reference phase angles $\theta_{1d}$, $\theta_{2d}$, ..., $\theta_{nd}$ for harmonic voltages to a calculation unit 437d, which in response thereto and in response to the actual angle $\theta_e$ between rotating reference frame and another reference frame directly produces the AC drive signal Vdac. Thereby, the harmonic number is denominated with 1, 2, ..., n. Correspondingly, the database 470 provides reference amplitudes $A_{1q}$, $A_{2q}$, ..., $A_{nq}$ for harmonic voltages and reference phase angles $\theta_{1q}$, $\theta_{2q}$, ..., $\theta_{nq}$ for harmonic voltages to the calculation unit 437q, which in response thereto and in response to the actual angle $\theta_c$ between rotating reference frame and another reference frame directly produces the AC drive signal Vqac.

The control system 400 further comprises two adders 250d and 250q. As can be seen from FIG. 4, the adder 250d receives a DC drive signal Vddc from the DC current controller 220, which is added to the AC drive signal Vdac yielding the modified voltage drive signal Vd, which is fed to the stator coils of the electric generator. Correspondingly, the adder 250q receives a DC drive signal Vqdc from the DC current controller 220, which is added to the AC drive signal Vqac yielding the modified voltage drive signal Vq, which is also fed to the stator coils of the electric generator.

In order to improve the performance of the (feed forward) controllers 200, 300 and 400, which means that the quality of the modified drive signals Vd, Vq is improved such that noise and vibrations of the electric generator are further reduced, there are two advanced functions. These two advanced functions are (I) Auto Sweeping Function and (II) Auto Tuning Function (ATF).

(I) Auto Sweeping Function (ASF)

ASF is used to automatically achieve the optimal amplitudes $A_{1d}$, $A_{2d}$, ..., $A_{nd}$, $A_{1q}$, $A_{2q}$, ..., $A_{nq}$ and the optimal phases $\theta_{1d}$, $\theta_{2d}$, ..., $\theta_{nd}$, $\theta_{1q}$, $\theta_{2q}$, ..., $\theta_{nq}$ in the look-up tables 270 for the harmonic currents which are supposed to be injected in order to reduce the harmonic behavior of the generator of a wind turbine.

When wind speed is high enough, a turbine controller controls the wind turbine to fixed load points which yields a constant output power and constant rotor speed. The frequency or power converter is controlled to vary/sweep the phase and the amplitude of injected harmonic currents with a certain rate and order. Inside the turbine or the near turbine, a measurement such as a noise, a vibration, an acceleration and/or a torque measurement is carried out that can indicate a noise and/or vibration change of the generator. It is mentioned that instead of direct measurements is also possible to use estimated value(s) to replace the mentioned measurement.

The measurement results are used and recorded in a converter controller or turbine controller during sweeping. Fast Fourier Transformation (FFT) and/or Band Pass Filtering (BPF) may be used to calculate the amplitude of the measurement results at a certain frequency. Based on the calculated amplitude of the harmonic behavior at certain frequency during sweeping, the optimal phase and amplitude of harmonic currents at the load point can be selected and saved in the converter software or turbine software. The same process may be carried out at other load points of the wind turbine for achieving the full look up tables.

(II) Auto Tuning Function (ATF)

ATF is used in order to realize a fast search of optimal phase and amplitude for the injected harmonic currents and/or voltage when the wind turbine is running in normal mode. Again, inside the turbine or near the turbine, a measurement such as a noise, a vibration, an acceleration and/or a torque measurement is carried out that can indicate a noise and/or a vibration change of the electric generator of the wind turbine. Corresponding measurement results are used and recorded in a converter controller or turbine controller in normal operation of the wind turbine. Again FFT or BPF can be used to calculate the amplitude of the measurement at a certain frequency. In the following the amplitude (or the root mean square) of the FFT or BPF output (at a certain frequency) is denominated C. Again, it is also possible to use estimated values in order to replace the mentioned measurement.

The following algorithm or a similar algorithm could be used to track the optimal phase and amplitude of harmonic current when turbine is running.

At time interval k, the phase of a harmonic current for example $\theta_{qn}$ can be updated as below based on a previous measurement and a previous update of the phase at a time interval k-1:

$$\Delta\theta_{qn}(k)=\theta_{qn}(k)-\theta_{qn}(k-1)$$

$$\Delta C(k)=C(k)-C(k-1)$$

$$\theta_{qn}(k+1)=\theta_{qn}(k)-\lambda_1 \cdot \text{sign}(\Delta\theta_{qn}(k) \cdot \Delta C(k))$$

Thereby, $\lambda_1$ is the learning gain for the phase.

Similarly, amplitude of harmonic current for example $A_{qn}$ can be updated as below:

$$\Delta A_{qn}(k)=A_{qn}(k)-A_{qn}(k-1)$$

$$\Delta C(k)=C(k)-C(k-1)$$

$$A_{qn}(k+1)=A_{qn}(k)-\lambda_2 \cdot \text{sign}(\Delta A_{qn}(k) \cdot \Delta C(k))$$

Thereby, $\lambda_2$ is the learning gain for the amplitude.

It is mentioned that the above given algorithm for ATF can also be used to find the optimal values in look-up tables.

The above elucidated embodiments presented in this application may in particular provide the following advantages:

(A) Acoustic noise and vibrations of an electromechanical transducer can be significantly reduced.

(B) Torque ripples in particular of an output of an electric generator can be minimized.

(C) Radial force/pressure ripple of an electromechanical transducer can be minimized.

(D) An implementation of the method into actual available electromechanical transducers can be realized by software. Therefore, there are no or only a negligible additional costs for implementing the method in connection with available electromechanical transducers.

(E) Due to typically comparatively small amplitudes of harmonic currents, an implementation of the method has very low additional energy losses.

It should be noted that the term "comprising" does not exclude other elements or steps and the use of articles "a" or "an" does not exclude a plurality. Also elements described in association with different embodiments may be combined. It should also be noted that reference signs in the claims should not be construed as limiting the scope of the claims.

The invention claimed is:

1. A method for controlling the operation of an electromechanical transducer, the method comprising:
determining during a first period of time a first strength of the harmonic operational behavior of the electromechanical transducer, wherein the electromechanical transducer is a permanent magnet generator in a wind turbine, wherein the electromechanical transducer exhibits a harmonic operational behavior which is given by electric and/or mechanic oscillations having frequency components different from a fundamental frequency being assigned to a fundamental operational behavior of the electromechanical transducer,
determining during a second period of time a second strength of the harmonic operational behavior of the electromechanical transducer, wherein the second period of time is different from the first period of time,
calculating a harmonic control signal in response to both the determined first strength of the harmonic operational behavior and the determined second strength of the harmonic operational behavior by observing at least one value of operational parameters of the electromechanical transducer and by deriving from a database the harmonic control signal as a function of the at least one observed value of the operational parameters of the electromechanical transducer,
generating a modified drive signal based on the calculated harmonic control signal,
supplying the generated modified drive signal to electromagnetic coils of a stator of the electromechanical transducer,
modifying at least one output value of the database,
evaluating strength of torque ripple oscillations and/or radial force/pressure ripple oscillations which occur in response to the at least one modified output value, and
determining at least one improved output value of the database based on the evaluated strength.

2. The method as claimed in claim 1, wherein the harmonic operational behavior is based on torque ripple oscillations and/or radial force/pressure ripple oscillations.

3. The method as claimed in claim 1, wherein
during the first period of time a first test drive signal is supplied to the electromagnetic coils of the stator of the electromechanical transducer, and
during the second period of time a second test drive signal is supplied to the electromagnetic coils of the stator of the electromechanical transducer,
wherein the second test drive signal is different from the first test drive signal.

4. The method as claimed in claim 1, wherein determining the first strength and/or the second strength of the harmonic operational behavior comprises using the result of a direct measurement or estimation of the harmonic operational behavior of the electromechanical transducer.

5. The method as claimed in claim 1, wherein determining the first strength and/or the second strength of the harmonic operational behavior comprises using at least one of a measurement value and/or estimated value and an available system value of observables being indicative for torque ripple oscillations and/or for radial force/pressure ripple oscillations of the electromechanical transducer.

6. The method as claimed in claim 1, wherein calculating the harmonic control signal comprises
   observing at least one value of operational parameters of the electromechanical transducer and
   deriving from a database the harmonic control signal as a function of the observed value of the operational parameters of the electromechanical transducer.

7. The method as claimed in claim 6, wherein the database stores
   reference amplitudes for harmonic currents and/or harmonic voltages and
   reference phase angles for harmonic currents and/or voltages for the harmonic control signal.

8. The method as claimed in claim 6, further comprising:
   updating the database based on the determined first strength of the harmonic operational behavior of the electromechanical transducer and on the determined second strength of the harmonic operational behavior of the electromechanical transducer.

9. The method as claimed in claim 6, further comprising:
   modifying at least one output value of the database,
   evaluating the strength of torque ripple oscillations and/or radial force/pressure ripple oscillations which occur in response to the at least one modified output value, and
   determining at least one improved output value of the database based on the evaluated strength.

10. The method as claimed in claim 1, wherein the operational parameters being observed comprise at least one of
    a frequency of an AC signal being actually generated by the electromechanical transducer or being actually consumed by the electromechanical transducer,
    a power being actually generated by the electromechanical transducer or being actually consumed by the electromechanical transducer, and
    an actual rotational angle of the rotor of the electromechanical transducer.

11. The method as claimed in claim 1, wherein generating a modified drive signal comprises adding an AC drive signal being associated with the harmonic operational behavior of the electromechanical transducer to a DC drive signal being associated with the fundamental operational behavior of the electromechanical transducer.

12. The method as claimed in claim 1, wherein
    the DC drive signal is generated by a DC controller, which is driven by a fundamental controller for controlling a fundamental drive signal for the electromagnetic coils of the stator, wherein the fundamental drive signal is associated exclusively with the fundamental operational behavior of the electromechanical transducer and
    the AC drive signal is generated by an AC controller, which is operated as a function of the determined harmonic control signal being indicative for the harmonic operational behavior of the electromechanical transducer.

13. The method as claimed in claim 1, wherein generating the modified drive signal comprises adding the calculated harmonic control signal to a DC drive signal being associated with the fundamental operational behavior of the electromechanical transducer.

14. The method as claimed in claim 1, wherein the modified drive signal is generated by a general control unit as a function of
    (a) the calculated harmonic control signal and
    (b) a fundamental control signal being generated by a fundamental controller for controlling a fundamental drive signal for the electromagnetic coils of the stator, wherein the fundamental drive signal is associated exclusively with the fundamental operational behavior of the electromechanical transducer.

15. The method as claimed in claim 1, wherein the modified drive signal is generated as a further function of a current being actually generated by the electromechanical transducer or being actually consumed by the electromechanical transducer.

16. A control system for controlling the operation of an electromechanical transducer, the control system comprising:
    a determining unit for
        determining during a first period of time a first strength of the harmonic operational behavior of the electromechanical transducer, wherein the electromechanical transducer is a permanent magnet generator in a wind turbine, wherein the electromechanical transducer exhibits a harmonic operational behavior which is given by electric and/or mechanic oscillations having frequency components different from a fundamental frequency being assigned to a fundamental operational behavior of the electromechanical transducer, and
        determining during a second period of time a second strength of the harmonic operational behavior of the electromechanical transducer, wherein the second period of time is different from the first period of time,
    a calculating unit for calculating a harmonic control signal in response to both the determined first strength of the harmonic operational behavior and the determined second strength of the harmonic operational behavior by observing at least one value of operational parameters of the electromechanical transducer and by deriving from a database the harmonic control signal as a function of the at least one observed value of the operational parameters of the electromechanical transducer,
    a generating unit for generating a modified drive signal based on the calculated harmonic control signal,
    a supplying unit for supplying the generated modified drive signal to electromagnetic coils of a stator of the electromechanical transducer, and
    a unit for modifying at least one output value of the database,
    evaluating strength of torque ripple oscillations and/or radial force/pressure ripple oscillations which occur in response to the at least one modified output value, and
    determining at least one improved output value of the database based on the evaluated strength.

* * * * *